Aug. 10, 1937.  A. LAUKHUFF  2,089,274
CUTTING MACHINE
Filed July 1, 1935  2 Sheets-Sheet 1
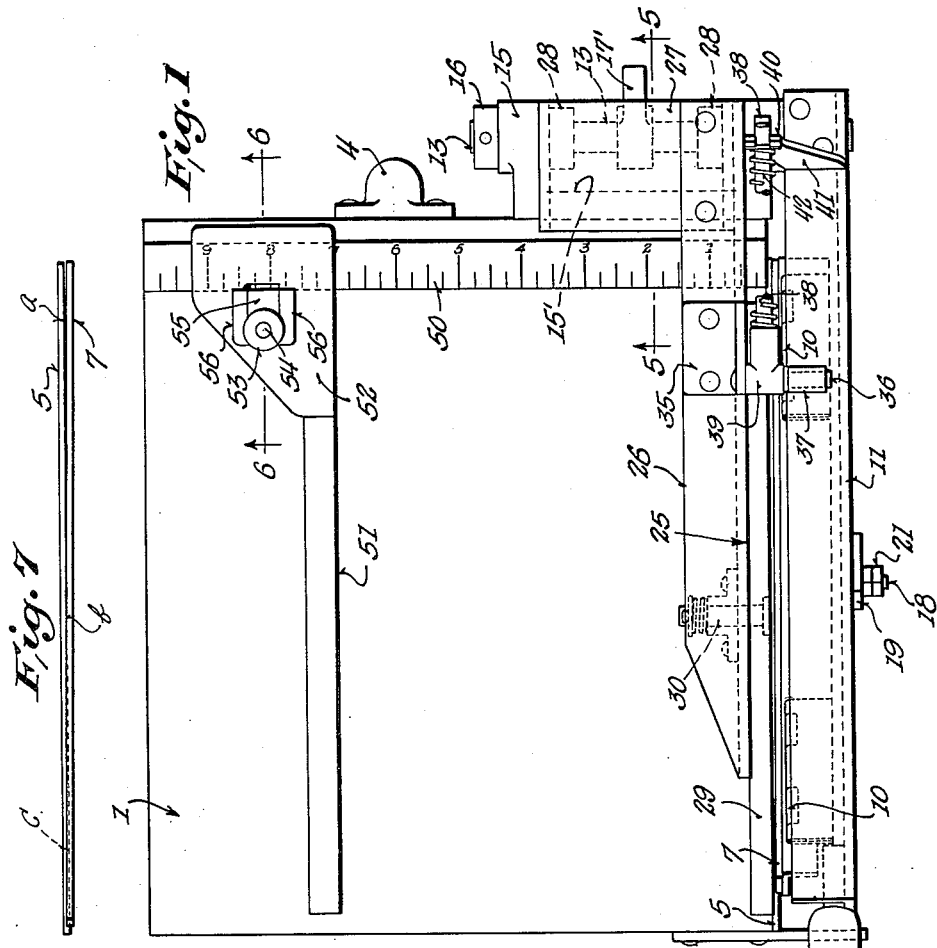
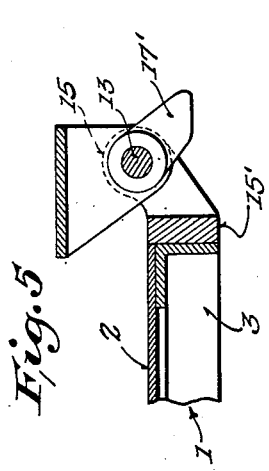
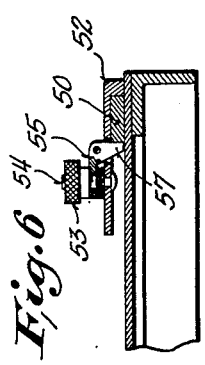
INVENTOR.
Alfred Laukhuff
BY
ATTORNEY.

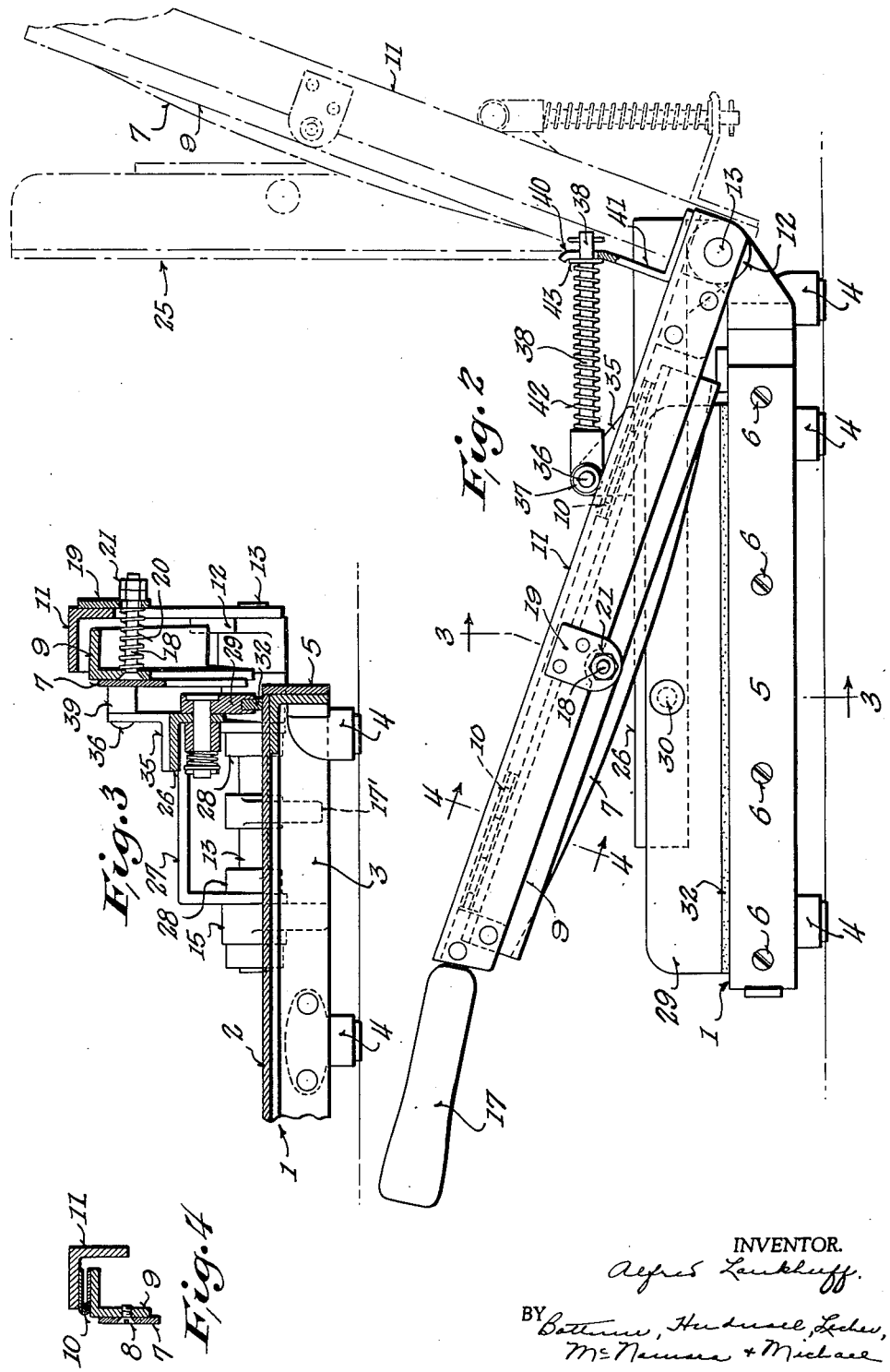

Patented Aug. 10, 1937

2,089,274

UNITED STATES PATENT OFFICE 2,089,274

CUTTING MACHINE

Alfred Laukhuff, Milwaukee, Wis., assignor to Alfa Machine Company, Milwaukee, Wis., a corporation of Wisconsin Application July 1, 1935, Serial No. 29,196

13 Claims. (Cl. 164—44)

This invention relates to an improvement in cutting machines and is especially designed and adapted for embodiment in a hand operated type of cutter although also capable of advantageous use in many respects in power cutters.

One of the principal objects of the invention is to so construct and organize the cooperable blades of the cutter that only the portions of the edges of the blades that are actively cutting are in operative engagement, the arrangement being such that the portion of the edge of the movable blade which trails the portion actively cutting is displaced laterally from engagement with the opposed portion of the fixed blade. In this way the wear on the edge of the blade is uniform throughout its extent and the cutting action is rendered more effective.

Another object of the invention is to provide a cutting machine having these advantages and capacities and which is extremely simple in its construction, very compactly organized as well as reliable and effective in operation and easy and convenient to operate.

Another object is to combine with the cutters work clamping means effective to securely hold the work against the cutting table during the cutting operation. The work clamping means is co-ordinated in its action with the cutters so that when the movable cutter is depressed or operated the work clamp will be firmly biased into engagement with the work on the cutting table and yet when the pivoted cover is thrown up to inoperative position the work clamp is automatically elevated away from the work table.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a plan view of a cutting machine embodying the present invention;

Figure 2 is a view thereof in end elevation;

Figure 3 is a view in transverse vertical section taken on line 3—3 of Figure 2;

Figure 4 is a similar view taken on line 4—4 of Figure 2;

Figure 5 is a view in vertical section taken on line 5—5 of Figure 1;

Figure 6 is a similar view taken on line 6—6 of Figure 1; and

Figure 7 is a fragmentary view in top plan illustrating the novel manner in which the fixed and movable blades coact.

Referring to the drawings, it will be seen that the cutting machine embodying the present invention comprises a cutting table designated generally at 1, and which may consist of a metal plate 2 suitably secured to a rectangular metal frame 3 which may be constructed of angle iron and which is supported on suitable feet 4.

Fixed to one side of the frame is a fixed knife 5. The knife 5 is preferably constituted of tool steel and is rigidly but removably secured in place by a suitable number of countersunk screws 6 (see Figure 2).

Cooperable with the fixed blade 5 is a movable blade 7, also constructed of tool steel and similarly secured by countersunk screws 8 to a carrier 9. The carrier 9 may be constituted of a piece of angle iron and it is pivotally supported by means of hinges or other suitable pivots 10 to an operating bar or lever 11, which is constructed of angle iron stock. From the drawings it will be seen that the vertical section of the angle iron carrier 9 has the movable knife 7 fixed thereto whereas the hinges 10 pivotally interconnect the horizontal sections of the angle irons 9 and 11. In this way the movable knife is mounted for movement toward and away from the cutting plane, or, in other words, for movement back and forth transversely with respect to the fixed knife.

One end of the knife operating bar or lever 11 has a bearing bracket 12 riveted or otherwise suitably secured thereto. This bracket 12 is mounted, preferably fixed, to one end of a shaft 13 supported for rotation in suitable bearings 15 integral with the ends of a bracket 15' suitably secured to the frame 3 of the cutting table. The bracket 12 prevents axial movement of the shaft 13 in one direction and a collar 16, pinned to the other end of the shaft 13 and engageable with the adjacent bearing 15, prevents endwise movement of the shaft 13 in the other direction. As a consequence the shaft 13 is constrained to rotation and the knife operating bar 11 together with knife carrier 9 are constrained to swinging movement in a definite plane.

A handle 17 is fixed to the outer end of the knife operating bar or lever 11 to facilitate operation thereof. When the bar 11, carrier 9 and knife 7 are swung upwardly to inoperative position (see dot and dash line showing in Figure 1) they are held in such position by gravity and by virtue of the engagement of a stop 17' (see Figure 5) secured on shaft 13 with the adjacent portion of frame 3.

In the construction shown, the knife carrier 9 is not parallel to the bar 11 but is arranged at a slight angle thereto so that the knife 7, when moved downwardly, tends to traverse the cutting plane at a slight angle. The inner edge of the knife, that is, the portion thereof adjacent the pivotal mounting of the bar 10, is arranged to move downward in the cutting plane so that its edge will properly engage the corresponding edge portion of the fixed knife. As the movable knife 7 continues to descend successive edge portions engage the edge of the fixed knife and the movable knife is cammed or swung in a counter-clockwise direction as viewed in Figures 3 and 4, whereby portions of the edge of the movable blade which trail the portions thereof actively cutting and engaged with the corresponding edge portion of the fixed blade will be displaced from engagement with the fixed blade, thus preventing unnecessary wear on such trailing portions. This action is illustrated to advantage in Figure 7 where the space between portions of the blades that have finished their cutting is indicated at $a$, the engaged portions at $b$ and the portion $c$ of the movable knife it will be noted overlaps the underlying portion of the fixed blade but of course will be displaced transversely to properly engage the fixed blade when it has been swung down to such position.

For the purpose of urging the movable blade into proper engagement with the fixed blade or towards the cutting plane, a stud 18 has its head secured to the carrier 9 and extends loosely through a guide lug 19 provided on the bar 11. A coil spring 20 encircles the stud 18 and has one end abutting the carrier 9 and its other end abutting the lug 19. This spring is compressed and tends to push the movable knife toward the cutting plane. The extent to which the spring 20 may push the knife 7 towards the cutting plane is limited by nuts 21 threaded on the guide stud 18 and engaged with the bracket 19.

A work clamp designated generally at 25 is provided and comprises a carrier 26 secured at one end to a yoke 27 having bearing portions 28 rotatably mounted on the shaft 13. The carrier 26 is preferably in the form of an angle iron. A work clamping member 29 is disposed flush against the vertical section of this angle iron carrier 26 and at its center is pivotally connected thereto by means of a pivot arrangement 30. The work clamp 29 has a work engaging strip 32 of rubber or other suitable material confined in and projecting beyond a groove in its lower edge.

The weight of the carrier 26 and work clamp 29 bias these parts to a position where the clamp 29 is effective to hold a sheet to be cut in proper position on the cutting table. The present invention proposes to enhance or supplement this biasing action during the cutting operation and for this purpose a bracket 35 is fastened to the upper horizontal member of the carrier 26. A pin 36 is fixed to the bracket and projects laterally therefrom and over the knife operating bar 11 so that when this bar 11 is raised upwardly it engages the pin. A yieldable sleeve 37 may be placed on the portion of the pin 36 engageable with the bar 11 to prevent scarring or wear. A rod 38 is provided and has at one end a fitting 39 which pivotally fits on the pin 36. The opposite end portion of this rod 38 is slidable through the forked upper end 40 of a bracket or projection 41 carried by the inner end of the bar 11. A spring 42 encircles the rod 38 and bears against the fitting 39 at one end and at its other end against a washer 43 which abuts up against the fork 40 of projection 41.

When the knife is operated, that is, when the bar 11 is depressed, the bracket 41 compresses the spring 42 and the spring in turn transmits this pressure to the work clamp to more firmly press the same down against the work on the table 1. When the bar 11 is elevated it engages the sleeve 38 on the pin 36 to lift the clamp 25 away from the table. If it is desired to use the machine without the work clamp, the rod 38 is disengaged from the fork 40 of projection 41 and the clamp thrown up to inoperative position where it remains by virtue of the engagement of an edge of its yoke 27 with the stop 17'.

The cutting table may be provided with a suitable gauge shown as consisting of a gauge strip 50 fastened to the table and having suitable graduations and numerals thereon. A gauge bar 51 is provided and has at one end a slotted guide 52 which embraces the strip 50 and is slidable therealong. The adjustable gauge bar 51 may be secured in any suitable adjustment by manipulating a milled nut 53 which has threaded engagement on a stud 54 fixed to the guide 52. The nut 53 bears against one arm of a bell crank lever 55 fulcrumed on spaced lugs 56 secured to the guide 52. An arm 57 of the bell crank lever 55 is designed to frictionally engage the gauge strip 50 when the nut is turned down thereby holding the gauge bar 51 in place.

While in the construction shown the angularity between the movable knife or blade and the fixed blade is obtained by angularly disposing the carrier 9 to the operating bar 11, the operating bar 11 swinging in a vertical plane, the same effect may be had by angling the shaft 13 and having the carrier 9 and bar 11 parallel.

While I have shown and described one construction in which the invention may be advantageously embodied, it is to be understood that this construction has been selected merely for the purpose of illustration or example and that various changes in the size, shape and arrangement of the parts may be made without departing from the spirit of the invention or the scope of the subjoined claims.

The invention claimed is:

1. A cutting machine comprising a cutting table, a fixed knife secured thereon, a knife operating bar pivotally mounted on the table for swinging movement toward and from the fixed knife, a knife carrier pivotally interconnected with the bar for movement toward and from the cutting plane, yieldable means for urging the carrier toward the cutting plane and a knife carried by said carrier, said bar, when operated, swinging said movable knife at a slight angle to the cutting plane whereby only the portion of the movable knife actively cutting engages the corresponding portion of the fixed knife.

2. A cutting machine comprising a cutting table, a fixed knife secured thereto, a movable knife, a carrier therefor consisting of a piece of angle iron, said movable knife being secured to the vertical section of said angle iron carrier, a knife operating bar also consisting of a piece of angle iron and having one end pivotally mounted with respect to the cutting table, pivotal connections between the horizontal sections of said angle irons and a spring acting against the bar of the carrier for urging the movable knife toward the cutting plane, said movable knife being so related to the cutting plane that only the portion of its edge actively cutting is in cooperative engagement with the fixed knife.

3. A cutter comprising a cutting bed, a fixed knife secured to one edge thereof, a movable knife, an angular carrier bar for the movable knife, an angular operating bar therefor, hinges pivotally connecting the horizontal members of said bars, a pivotal mounting for said operating bar, said movable knife being disposed to swing down across the cutting plane at an angle so that only the portion of the cutting edge thereof actively cutting is disposed for engagement with the edge of the fixed blade, an expansible coil spring disposed between the vertical members of the bars to urge the movable knife toward the cutting plane, and a guide stud for said spring carried by one of the bars.

4. A cutting machine comprising a cutting table, a fixed knife secured thereto, a pivoted knife cooperable with the fixed knife, a work clamp biased to engage work on the table and hold the same in position during cutting and means to apply an additional bias to the work clamp during the cutting operation, and comprising projections on the clamp and pivoted knife, one of said projections having a guide, a rod pivoted to the other projection and slidable through the guide, and a spring on the rod and interposed between the projections.

5. A cutter comprising a cutting table, a fixed knife secured to one edge of the table, a pivoted cutter cooperable with said fixed cutter, a pivoted work clamp biased to a position where it clamps the work against the table, means projecting laterally from said work clamp and overlying the pivoted cutter whereby when the cutter is raised a predetermined distance it elevates the clamp, and a one-way yieldable connection between the cutter and the clamp to place an additional bias on the clamp when the cutter is operated.

6. A cutter comprising a cutting table, a fixed knife secured to one edge of the table, a pivoted cutter cooperable with said fixed cutter, a pivoted work clamp biased to a position where it clamps the work against the table, and means projecting laterally from said work clamp and overlying the pivoted cutter in vertically spaced relation thereto whereby when the cutter is raised a predetermined distance it elevates the clamp.

7. A cutter comprising a cutting table, a fixed knife secured to one edge of the table, a pivoted cutter cooperable with said fixed cutter, a pivoted work clamp biased to a position where it clamps the work against the table, means projecting laterally from said work clamp and overlying the pivoted cutter whereby when the cutter is raised a predetermined distance it elevates the clamp and means for applying an additional bias to said work clamp during the operation of the pivoted cutter and comprising a rod pivotally connected to the clamp, a fork connected to the pivoted knife and through which the rod is slidable, and a spring on the rod and against which the fork works when the cutter is operated.

8. A cutter comprising a cutting table, a fixed cutter secured to one end of said table, a cooperable cutter having one end pivotally mounted at one side of the table, a work clamp comprising a carrier pivotally supported for swinging movement about the same axis as the cooperable cutter and a work engaging member pivoted to said carrier and means for applying a bias to said work clamp during the operation of the cutters and comprising a bracket on said carrier, a pin extending laterally from the bracket, a projection upstanding from said cooperable cutter and having an opening, a rod pivoted to said pin and slidable through said opening and a spring on the rod against which said projection works when the cooperable cutter is operated.

9. A cutter comprising a cutting table, a fixed cutter secured to one end of said table, a cooperable cutter having one end pivotally mounted at one side of the table, a work clamp comprising a carrier pivotally supported for swinging movement about the same axis as the cooperable cutter and a work engaging member pivoted to said carrier and means for applying a bias to said work clamp during the operation of the cutters and comprising a rod pivotally connected to the carrier and slidably interfitted with the cooperable cutter and a spring on the rod adapted to be compressed by the cooperable cutter when the latter is depressed and exerting a yieldable pressure on the clamp at such time 10. A cutter comprising a fixed blade having a cutting edge, a movable blade having its cutting edge inclined across the edge of the fixed blade at a slight angle, an operating lever for the movable blade, and means interconnecting the operating lever with the movable blade from the lever and also to provide for movement of the movable blade transversely with respect to the fixed blade so that portions of the edge of the movable blade trailing portions thereof actively cutting are displaced from engagement with the fixed blade.

11. A cutter comprising a fixed blade having a cutting edge, a movable blade having its cutting edge inclined across the edge of the fixed blade at a slight angle, an operating lever for the movable blade, means for supporting said lever for swinging movement about a fixed axis while preventing movement of the lever longitudinally of the axis, and means interconnecting the operating lever with the movable blade to provide for positive actuation of the movable blade from said lever and also to provide for movement of the movable blade toward the lever during the cutting operation.

12. A cutter comprising a cutting table, a fixed knife secured thereto, a movable knife having its cutting edge inclined across the fixed knife at a slight angle during cutting, an operating lever pivoted to the table, pivotal connecting means between the lever and the fixed knife providing for the transmission of actuating force from the lever to the movable knife during cutting and also providing for movement of the movable knife toward the lever under the influence of the engaged portions of said inclined edges during cutting and spring means for urging the movable blade towards the fixed blade.

13. A cutter comprising a cutting table, a fixed cutter secured to one end of said table, a cooperable cutter having one end pivotally mounted at one side of the table, a work clamp comprising a carrier pivotally supported for swinging movement about the same axis as the cooperable cutter and a work engaging member pivoted to said carrier and means for applying a bias to said work clamp during the operation of the cutters.

ALFRED LAUKHUFF.